April 27, 1965  J. GOWER-REMPEL  3,180,305
VEHICLE, CONTROL SYSTEM AND DRIVING SYSTEM THEREFOR
Filed Feb. 21, 1962                                6 Sheets-Sheet 1

INVENTOR.
JOHN GOWER-REMPEL
BY
*Attorney*

April 27, 1965  J. GOWER-REMPEL  3,180,305
VEHICLE, CONTROL SYSTEM AND DRIVING SYSTEM THEREFOR
Filed Feb. 21, 1962  6 Sheets-Sheet 2

INVENTOR.
JOHN GOWER-REMPEL
BY
Attorney

April 27, 1965  J. GOWER-REMPEL  3,180,305
VEHICLE, CONTROL SYSTEM AND DRIVING SYSTEM THEREFOR
Filed Feb. 21, 1962  6 Sheets-Sheet 3

INVENTOR.
JOHN GOWER-REMPEL
BY
Attorney

United States Patent Office 3,180,305
Patented Apr. 27, 1965

3,180,305
VEHICLE, CONTROL SYSTEM AND DRIVING SYSTEM THEREFOR
John Gower-Rempel, 2362 Kingston Road, Toronto 3, Ontario, Canada
Filed Feb. 21, 1962, Ser. No. 174,895
25 Claims. (Cl. 115—1)

This invention relates to a vehicle of the type which is capable of propelling itself over land of any type, swamps, snow, ice and water. This invention also relates to driving means for such a vehicle or for other types of vehicles. In addition, this invention also relates to control means for controlling the aforementioned driving means, in particular a single stick control system which is used for braking, steering, throttling and effecting variations in the power transmitted to the wheels of the vehicle and the speed of rotation of the wheels.

Accordingly it is one object of my invention to provide a vehicle which is adapted to propel itself on land of any type, swamp, snow, ice and water without requiring any modifications to be made to the vehicle when there is any change in the medium on or in which the vehicle is travelling.

It is another object of my invention to provide a vehicle which requires no complicated spring suspension, but nevertheless which gives a relatively smooth ride.

A further object of my invention is to provide a vehicle which is very light in weight and small in size, and hence which can be transported readily from place to place or dropped by parachute.

Yet another object of my invention is to provide a vehicle which is extremely light in weight in proportion to the load which the vehicle is capable of carrying.

A further object of my invention is to provide a vehicle which is constructed in such a manner as to permit it to climb very steep slopes, even when the slopes are covered with loose material such as gravel.

An additional object of my invention is to provide a wheeled vehicle which may be used with treads if so desired.

Yet an additional object of my invention is to provide a vehicle so constructed that it will remain afloat even if all the tires of the vehicle should become deflated.

Alternatively, another object of my invention is to provide a vehicle which, by virtue of the buoyancy of its tires, will remain afloat even if water enters the vehicle.

Yet another object of my invention is to provide driving and control means comprising engines, a transmission, clutches, brakes and controls for these devices, which driving and control means are all removable as a unit.

An important object of my invention is to provide a single rod control system which is adapted to control steering, braking, engine speed and power transmission.

A further object of my invention is to provide such a control system as aforementioned which operates in such a manner that while the engine on one side of the vehicle is speeded up to produce a turn, the engine on the other side is automatically throttled down and automatically braked.

In brief, a vehicle embodying my invention has a body and wheels rotatably associated therewith on both sides thereof and supporting the body, together with driving means for driving the vehicle and control means for controlling the driving means. The driving means comprise two independently operable internal combustion engines, two independently operable centrifugal clutches, two braking means, two independent variable pulleys, belt means, and driven means associated with each variable pulley. One of the clutches is driven by one of the engines, while the other of the clutches is driven by the other of the engines. One of the braking means is adapted to brake one engine, while the other braking means is adapted to brake the other engine. One of the belt means drives one of the pulleys and is driven from the output side of one clutch. The other belt means drives the other variable pulley and is driven from the output side of the other clutch. The driven means associated with each pulley are adapted to rotate the wheels on opposite sides of the vehicle independently of each other. The control means comprises a single rod pivotably mounted at a pivot axis adjacent one end of the rod and between the engines for forward and backward movement. A head is mounted on the rod remote from the pivot axis and is rotatable about the longitudinal axis of the rod. A hand-grip control rod extends on either side of the head and is rotatably mounted therein. A first engine throttle control cable is operatively connected between the hand-grip control rod and the throttle of one engine, while a second engine throttle control cable is operatively connected between the hand-grip control rod and one throttle of the other engine. A first brake control rod means is connected to operate one braking means, while a second brake control rod means is connected to operate the other braking means, and brake lever means associated with the single rod is adapted to operate the first and second brake control rod means. The position of the belt means in the variable pulleys is dependent upon the position of the single rod.

Additional objects and advantages of my invention and the manner in which the foregoing objects and advantages are achieved will become more apparent from the following detailed disclosure taken in conjunction with the appended drawings in which:

FIGURE 7 shows in detail my power transmission system, FIGURE 8 shows a part of my single rod control, a part of the rod and the head thereof being broken away, FIGURE 9 is a view taken along lines 9—9 in FIGURE 8, FIGURES 10 to 13 inclusive illustrate my braking system and braking control means, and FIGURES 14 to 16 inclusive depict my throttle and steering control means.

Figure 1:
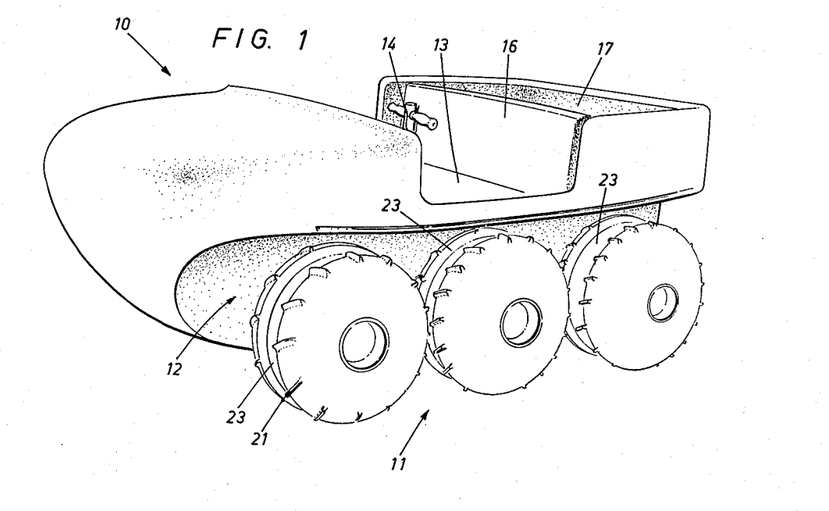
FIGURE 1 is a perspective view of a vehicle embodying my invention and showing the front and one side thereof.
Figure 2:
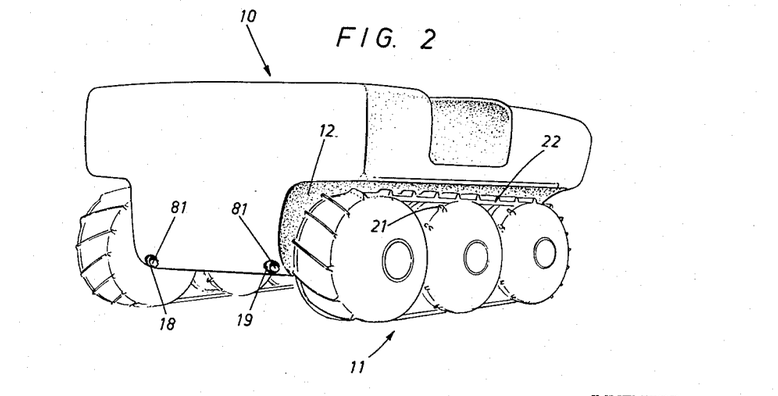
FIGURE 2 is a perspective view of the vehicle shown in FIGURE 1 showing the back and the other side thereof.
Figures 3, 4:
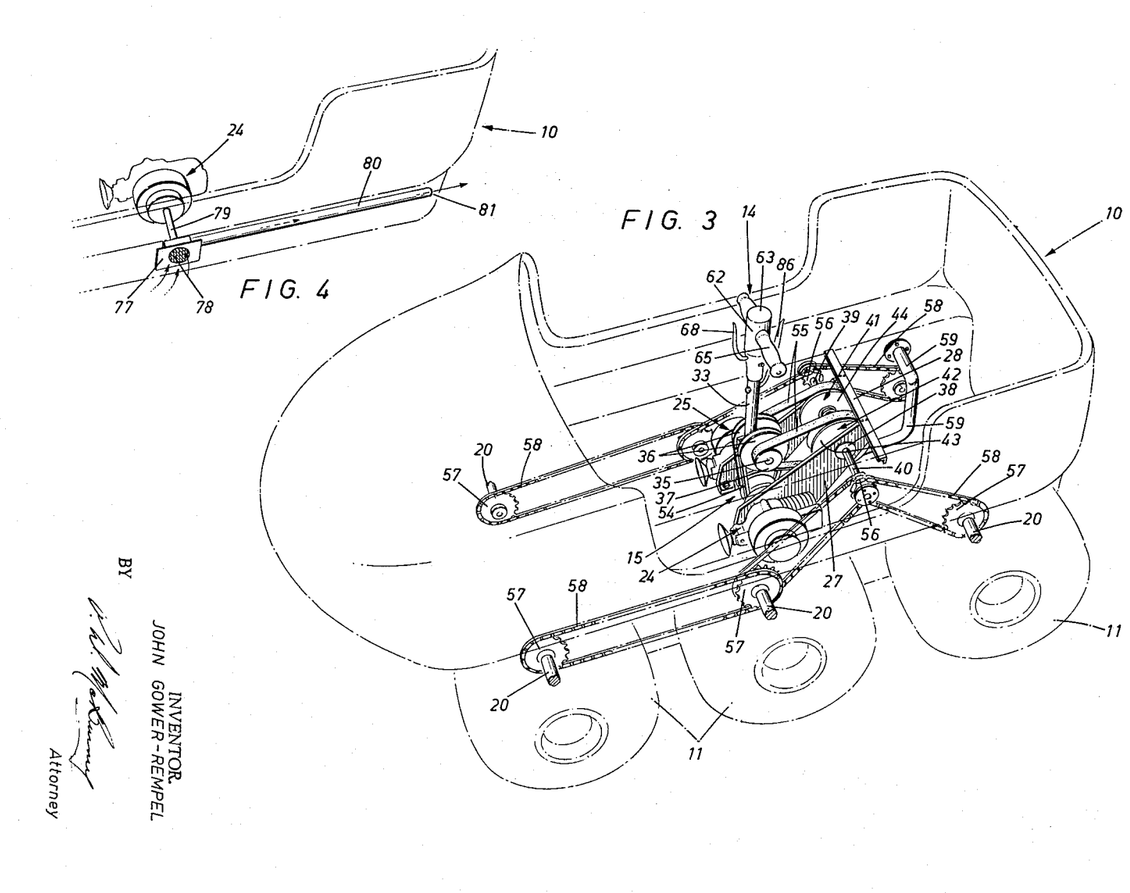
FIGURE 3 is a perspective view of my driving means and control means shown located in the body of a vehicle embodying my invention, the latter being in ghost outline.
FIGURE 4 depicts means not shown in FIGURE 3 whereby my vehicle may be propelled through water.

Referring now to FIGURES 1 to 4 for a general description of a vehicle embodying my invention, it will be seen that the vehicle has a body 10 and wheels 11 rotatably associated therewith on both sides thereof and supporting body 10. Body 10 has channels 12 on either side thereof in which wheels 11 are positioned. Body 10 may be made of any suitable light, strong material. I prefer to employ fibreglass, although it will be appreciated that other materials may be used with equal advantage. Provided in body 10 is a seat 13 for the operator and a passenger. As best shown in FIGURE 3, control means 14 and driving means 15 are housed in body 10, driving means 15 being located under seat 13, a back 16 therefor and a deck 17. It should be noted that seat 13, back 16 and deck 17 are readily removable as a unit to expose driving means 15. Providing in the rear wall of the vehicle, as best shown in FIGURE 2, are openings 18 and 19 positioned on either side of the longitudinal axis of the vehicle. Through these openings water may be expelled for the purpose of propelling the vehicle in water, as will become more apparent hereinafter.

Wheels 11 are mounted on axles 20 (FIG. 3) and are provided with raised lugs 21 which assist in providing a grip between the wheels and the land over which the vehicle is travelling, and which also assist in propelling the vehicle forward when it is travelling in water. Wheels 11, as shown in FIGURE 1, are provided with channels 23 cut therein, and as best shown in FIGURE 2, treads 22 may be located in channels 23 if desired and are precluded from slipping off wheels 11 by virtue of the engagement of treads 22 with the side walls of channels 23. Alternatively channels 23 need not be provided in wheels 11, in which case the channels would be filled in and lugs 21 would extend completely across wheels 11. It will be noted that my vehicle requires no complicated and expensive spring suspension or other type of suspension, the necessity for such a suspension being obviated by employing wheels 11 which are of the low pressure type and which are fully inflated at a pressure of about 1 lb. per square inch. Such low pressure wheels can readily be inflated by the operator without the necessity of employing an air pump and are excellent shock absorbers.

I have found that a vehicle of the type hereinbefore discussed will not sink in water even when filled with water, the natural buoyancy of wheels 11 preventing such an occurrence. On the other hand, the vehicle does not depend on the buoyancy of wheels 11 to keep it afloat, and consequently will remain afloat even if wheels 11 should be deflated. Experiments have shown that such a vehicle is quite capable of climbing a 45° slope even if the slope is covered with loose gravel.

*Driving means*

Figure 5:
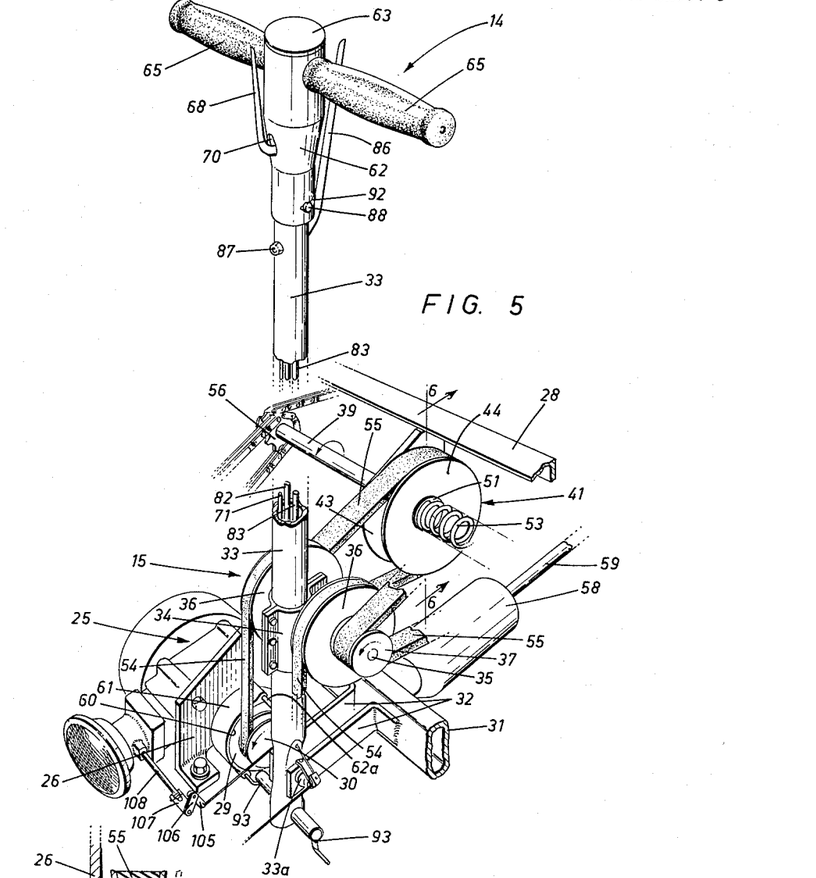
FIGURE 5 illustrates in greater detail driving means and control means embodying my invention.

Driving means embodying my invention are best shown in FIGURES 3, 5, 6 and 7. Referring to these FIGURES, I have shown two independently operable internal combustion engines 24 and 25 mounted on either side of the longitudinal axis of the vehicle. I prefer to employ 5½ H.P. chain saw engines with manual or kick starters (not shown), but it will be appreciated that other types of engines may be employed without departing from my invention. Positioned inside each engine are frame members 26 and 27 which are bolted to the bottom of the vehicle at one end thereof, the other ends of frame members 26 and 27 being fastened to a cross-support 28 suitably mounted in and fixed to body 10. The driving shafts (not shown) of engines 24 and 25 extend through frame members 27 and 26 respectively and each is connected to an independent centrifugal clutch 29, as best seen in FIGURE 5, where only one clutch is shown for the sake of simplicity. Secured to the output side of each clutch 29 and rotatable therewith is a pulley 30. Extending between frame members 26 and 27 and secured thereto is a cross-piece 31 having outwardly extending arms 32. A single control rod 33 which forms part of the control system to be hereinafter described is pivotally mounted adjacent one end thereof about a pivot axis 33a, pivot axis 33a being a pivot pin (not shown) extending through arms 32 adjacent the free ends thereof and extending through control rod 33. A bracket 34 is fastened to control rod 33 and carries a shaft 35 rotatable in bracket 34. Secured to shaft 35 are large pulleys 36 and small pulleys 37. Extending through frame members 26 and 27 and rotatable in bearings 38 therein are two independent shafts 39 and 40, each of which carries a variable pulley 41 and 42 respectively.

Figure 6:
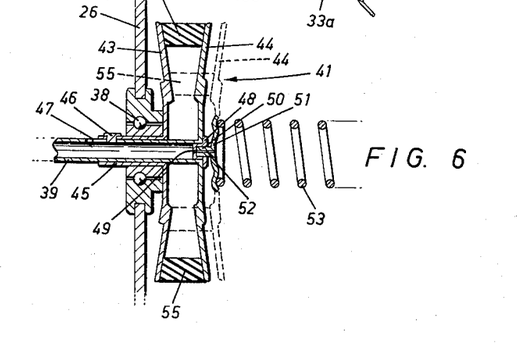
FIGURE 6 is a section taken along line 6—6 in FIGURE 5.

Variable pulley 41 is best shown in FIGURE 6 and comprises a fixed plate 43 and a movable plate 44, movable plate 44 being secured to shaft 39 which, it will be noted, is hollow. Fixed plate 43 is secured to a shaft 45 which is rotatable in bearing 38 and which is keyed to shaft 39 by a key 46. However, shaft 39 is longitudinally slidable in shaft 45 by virtue of a longitudinal slot 47 in shaft 39. The open end of shaft 39 is closed by a cap 48 having a channel 49 therein. Positioned in a recess in cap 48 and firmly secured to cap 48 is the protruding arm 50 of a plate 51, arm 50 and plate 51 being provided with a channel 52 communicating with channel 49 and the hollow interior of shaft 39. Variable pulley 42 is similarly constructed and has its movable plate 44 secured to shaft 40. Between the plates 51 secured to these variable pulleys is positioned a spring 53 which urges movable plates 44 towards fixed plates 43. Hollow shafts 39 and 40 preferably are filled with a suitable lubricant which finds its way to plates 51 through channels 49 and 52 and keeps these plates lubricated.

Belts 54 and 55 are provided on each side of control rod 33, belts 54 engaging pulleys 30 and 36 and belts 55 engaging pulleys 37 and variable pulleys 41 and 42, whereby power is independently transmitted from each engine 24 and 25 to each shaft 40 and 39 respectively. It should be noted that during independent rotation of variable pulleys 41 and 42, spring 53 slips on plates 51, the friction between plates 51 and spring 53 being reduced considerably by the aforementioned lubrication system. Associated with each variable pulley 41 and 42 are driven means for driving the wheels 11 on opposite sides of the vehicle independently of each other. These driven means comprise sprockets 56 secured to each shaft 39 and 40, sprockets 57 secured to each axle 20 and chains 58 extending between the various sprockets. It will be noted that double sprockets 56 are provided on each of shafts 39 and 40 and on axles 20 of each centre wheel. Sprockets 56 and 57 are inside body 10.

As best shown in FIGURES 3 and 5, the exhaust manifolds of engines 24 and 25 communicate with the hollow interior of cross-piece 31. Also communicating with the hollow interior of cross-piece 31 is a muffler 58 from which an exhaust pipe 59 extends through one side of body 10 above the water line of the vehicle.

The surface of clutches 29 form brake drums 60 on either side of control rod 33. Extending part way around and co-operating with each brake drum 60 is a brake band 61. One end of each brake band 61 is secured to control rod 33 by a pin 62a, pins 62a being disposed on opposite sides of control rod 33 and on the same side of pivot axis 33a thereof.

It should be noted that control means 14 and driving means 15 are readily removable as a unit from the vehicle. In order to remove them seat 13 and deck 17 are withdrawn, chains 58 are taken off sprockets 56 and 57, exhaust pipe 59 is uncoupled from the side wall of body 10, and the nuts holding frame members 26 and 27 to body 10 are removed. Control means 14 and driving means 15 then may be removed as a unit for servicing.

*Control means*

Control means 14 are best shown in FIGURES 3, 5, 10, 11, 14 and 16. Turning to these figures, I have shown a head 62 mounted on control rod 33 remote from the pivot axis 33a thereof and rotatable about the longitudinal axis of control rod 33. Head 62 is provided with a cap 63 which can be removed for the purpose of inspecting or repairing components located in head 62 and to be described in detail hereinafter. A hand-grip control rod 64 extends on either side of head 62 and is rotatable therein, hand-grip control rod 64 being provided with hand-grips 65 firmly secured thereto.

Transmission control apparatus and operation

Figures 7, 8, 9:
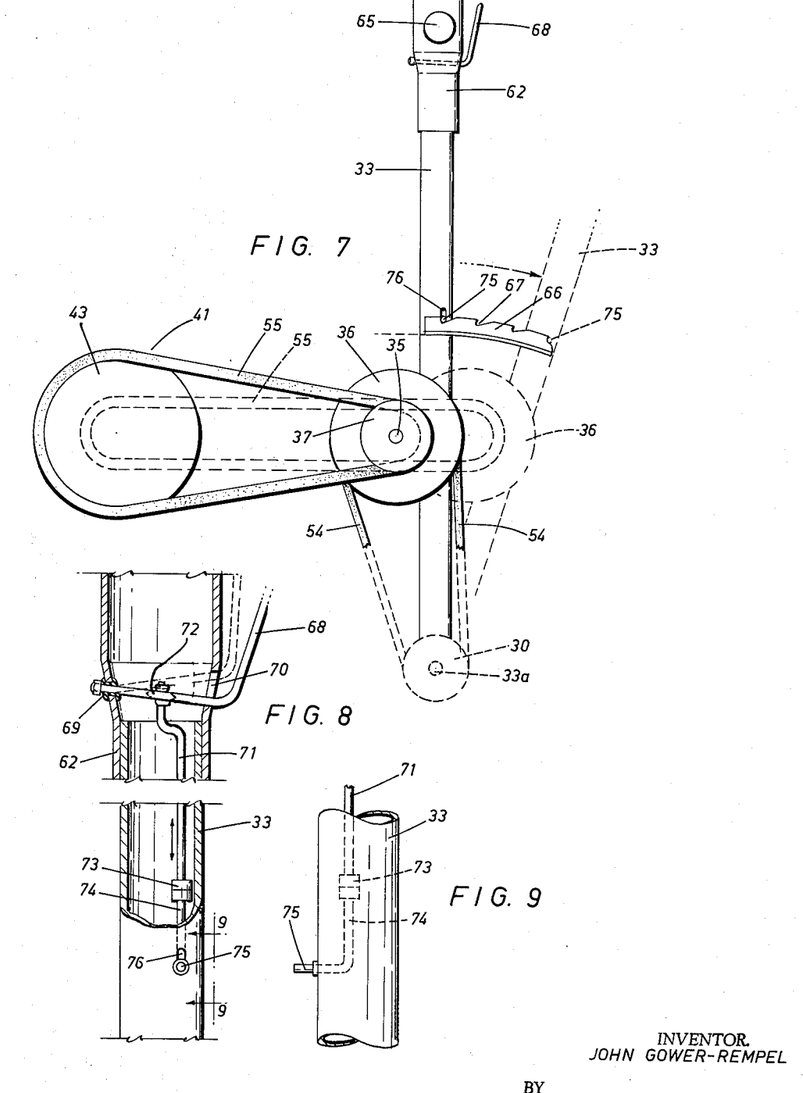

Referring to FIGURES 7 to 9 inclusive, I have shown a lever 68 pivotably mounted in head 62 by means of a rubber grommet positioned in an aperture in head 62 and through which lever 68 extends. Provided in the opposite side of head 62 is a slot 70 which permits lever 68 to move upwardly and downwardly in head 62. A bent rod 71 is pivotably mounted at 72 in lever 68 near the axis of rotation of control rod 33 and is secured at its opposite end through a swivel 73 to a generally L-shaped arm 74 having a pin end 75 extending through a slot 76 in control rod 33. As shown in FIGURE 8, rod 71 is offset for most of its length from the axis of rotation of control rod 33, so as to clear the brake control elements to be referred to hereinafter. As best shown in FIGURE 7, pin end 75 engages teeth 67 of an arm 66 when lever 68 is in the down position shown in FIGURE 8. Arm 66 is secured to a part of the frame for driving means 15 and does not move. Swivel 73 is employed to permit turning of rod 71 when head 62 is rotated about the longitudinal axis of control rod 33.

When the apparatus shown in FIGURE 7 is in the position shown in solid outlines, maximum torque for any given engine speed is being transmitted to wheels 11, and consequently the position shown corresponds to low gear in an automobile. When it is desired to alter the transmission ratio, lever 68 is raised by the operator to the dotted position shown in FIGURE 8, thereby raising rod 71 and arm 74 and lifting pin 75 from the tooth 67 which it is engaging. Control rod 33 then may be pushed forward in the direction shown by the arrow in FIGURE 7, so that belts 55 are drawn inwardly closer to the longitudinal axis of variable pulleys 41 and 42 to the position shown in dotted outlines in FIGURE 7, belts 55 forcing movable plates 44 of the variable pulleys outwardly against the action of spring 53 during this movement of control rod 33. In the position shown in dotted outlines in FIGURE 7 minimum torque at any given engine speed is being transmitted to wheels 11, while the speed of wheels 11 is at a maximum at any given engine speed. This latter position corresponds to high gear in an automobile. Any suitable transmission ratio can be effected by this method, and when the desired ratio has been selected, lever 68 is released causing pin end 75 to drop into the appropriate tooth 67 in arm 66, thereby precluding control rod 33 from being pulled out of its selected position by the natural tendency of belts 55 to work to the periphery of variable pulleys 41 and 42 and draw control rod 33 rearwardly.

Water propulsion

As aforementioned, a vehicle embodying my invention is capable of being propelled in water. The means for effecting this are best shown in FIGURE 4 where I have shown a water pump 77 having a screened inlet 78. Water pump 77 is driven from engine 24 through a shaft 79. Connected to the output side of pump 77 is a pipe 80 which is positioned inside body 10 and which has an outlet 81 (FIGURE 2), outlet 81 being either above or beneath the water line of the vehicle and at opening 18. It will be appreciated that a similar water pump is positioned on the other side of the longitudinal axis of the vehicle, is driven by engine 25 and has an outlet 81 in opening 19. When the vehicle is travelling in water, water is drawn into pumps 77 through inlets 78 and is expelled on either side of the longitudinal axis of the vehicle through outlets 81. Steering of the vehicle in water is effected by running engines 24 and 25 at different speeds, and the means whereby this is effected will become more apparent hereinafter.

As an alternative, instead of employing water pumps two propellors each driven by a different one of engines 24 and 25, each located below the water line of the vehicle at the stern thereof and positioned on the opposite sides of the longitudinal axis of the vehicle may be used.

Brake control and operation

My novel brake control system is best seen by referring to FIGURES 10 to 13 inclusive. Extending through control rod 33 are brake control rods 82 and 83, each of which has a stop 84 secured thereto by any suitable means, such as a set-screw. A link 85 connects brake control rods 82 and 83, stops 84 resting on link 85. Brake control rods 82 and 83 are slidable up and down in link 85. Extending through a slot (not shown) in control rod 33 is a brake lever 86 which is pivotably mounted at 87 as by means of a rubber grommet, the mounting being similar to the mounting of lever 68 shown in FIGURE 8. Brake lever 86 engages link 85 so that by the operator gripping lever 86 and drawing it inwardly towards head 62, both brake control rods 82 and 83 are raised jointly.

In order to provide independent and automatic operation of each brake control rod I have provided pins 88 secured to connecting arms 89. Brake control rods 82 and 83 are slidable in connecting arms 89, and the effective length of the brake control rods may be adjusted by altering the position of nuts 90 threadably connected to the ends thereof, and also by altering the position of stops 84 on the brake control rods at the same time. On each side of control rod 33 there is a slot 91 extending generally parallel to the longitudinal axis of control rod 33. Co-operating with each slot 91 is a cam slot 92, pins 88 extending through slots 91 and 92.

Figures 10, 11, 12, 13:
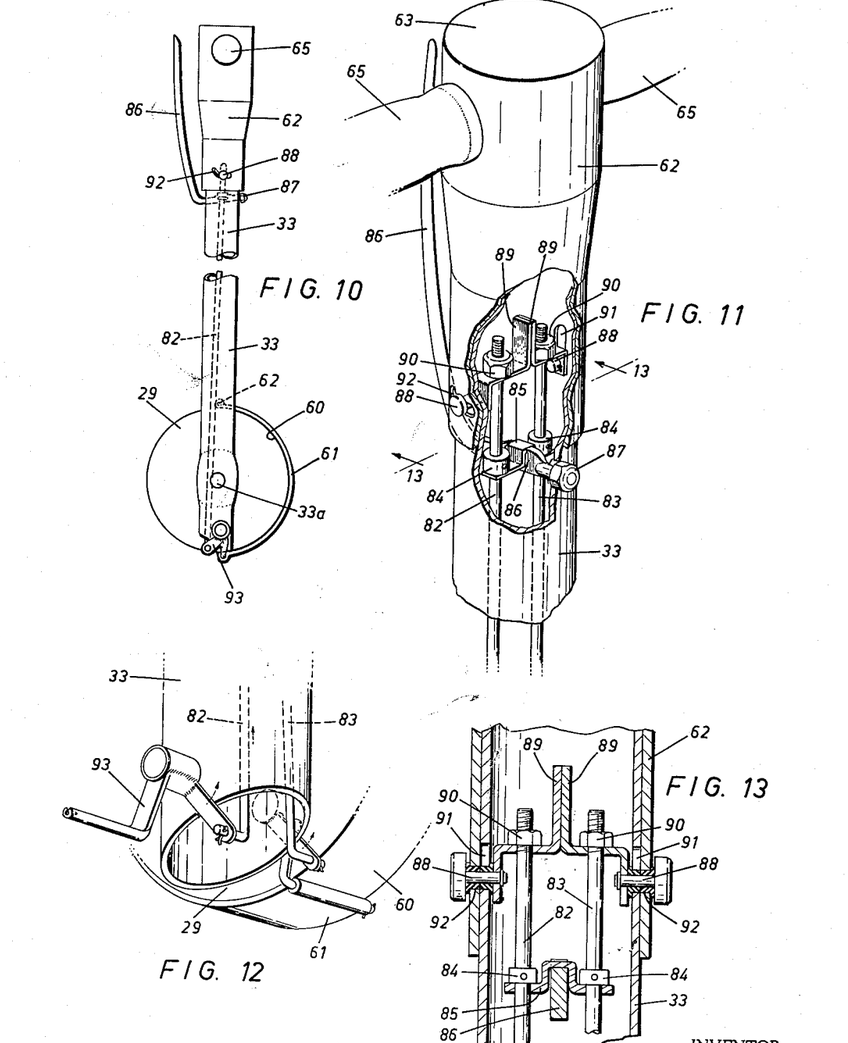

Turning now to the opposite end of brake control rods 82 and 83, as best shown in FIGURE 12, each brake control rod is connected to a brake band 61 through a crank 93, cranks 93 being pivotably mounted on control rod 33 below pivot axis 33a.

When head 62 is in its non-rotated position, as shown in FIGURE 11, and brake lever 86 is drawn towards head 62 by the vehicle operator, both brake control rods 82 and 83 are raised through the mechanism comprising brake lever 86, link 85 and stops 84, and the brake control rods 82 and 83 slide in connecting arms 89. Upward movement of brake control rods 82 and 83 causes pivotal movement of cranks 93 which draws brake bands 61 into engagement with brake drums 60, thereby slowing down each engine 24 and 25. As will become more apparent hereinafter, a vehicle embodying my invention is steered by slowing down the wheels on one side and speeding up the wheels on the opposite side. While this type of control can be effected by throttle control alone, it is advantageous, in order to permit very sharp turns, that throttle control should be accompanied by a braking of one of the engines. This is achieved automatically with the braking system which I employ. Referring to FIGURE 11, if head 62 is rotated in a counter-clockwise direction, the cam slot 92 shown in FIG. 11 will cause its co-operatnig pin 88 to gradually raise. This gradual raising of pin 88 will be transmitted through its co-operating connecting arm 89 to brake control rod 82, which will be raised by the upward movement of this connecting arm 89. Consequently crank 93 co-operating with brake control rod 82 will be pivoted and the brake band 61 actuated thereby will be drawn into contact with its mating brake drum 60. However, since the other pin 88 is travelling in the horizontal portion of its cam slot 92, the position of brake control rod 83 will not change and the other brake band 61 will not be drawn into contact with its mating brake drum 60. In this manner engine 25 is automatically braked, while engine 24 is not. Clockwise rotation of head 62 would cause the opposite result, namely braking of engine 24 but not engine 25.

It will be understood that rod 71 (FIGURE 8) is positioned in the space between brake lever 86 and one of pins 88.

An alternative but decidedly less preferable braking control system would be to employ a brake lever 86 for each brake control rod 82 and 83. In such a system simultaneous operation of both brake levers 86 would result in simultaneous operation of both brake control rods 82 and 83 and both brakes, and operation of only one brake lever 86 would result in operation of only the brake control rod and brake operated thereby. The system described hereinbefore is decidedly preferable to this latter system, however, because it is automatic in operation.

An important feature of my braking system is best seen in FIGURE 10 where it will be noted that the longitudinal axes of brake drums 60 are coincident with the pivot axis 33a of control rod 33. In view of this, and because one end of each brake band 61 is secured to control rod 33, when control rod 33 is moved forward or back about its pivot axis 33a, the distance between brake bands 61 and brake drums 60 remains constant, so that braking of engines 24 and 25 can be effected in any position of control rod 33.

*Throttle control and steering operation*

Figures 14, 15, 16:
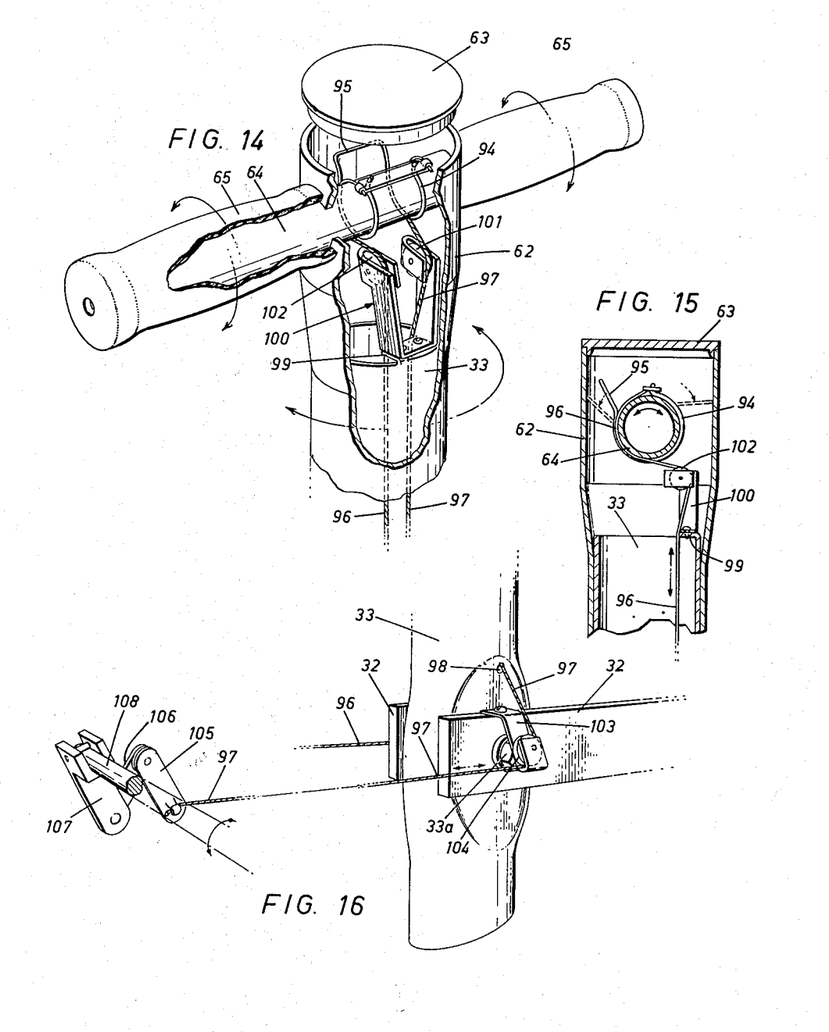

This aspect of my invention is best seen in FIGURES 14 to 16 inclusive. Referring to these figures, I have shown a spring 94 which resiliently grips handgrip control rod 64 and which has a projecting finger 95 which, upon a predetermined degree of rotation of handgrip control rod 64, is adapted to engage the inner side walls of head 62. When finger 95 so engages head 62, spring 94 slips on handgrip control rod 64 for a purpose which will become more apparent hereinafter. Connected to spring 94 are engine throttle control cables 96 and 97 which extend through control rod 33 and out apertures 98 on either side thereof. Secured to an inwardly projecting flange 99 at the upper end of control rod 33 is a generally U-shaped member 100 carrying guides in the form of rotatable pulleys 101 and 102. These pulleys are adjacent one another and are laterally offset with respect to the longitudinal axis of handgrip control rod 64. Secured to arms 32 are fingers 103 each of which carries a rotatable pulley 104. Engine throttle control cable 96 extends over pulley 102, out one aperture 98 and over one pulley 104. Engine throttle control cable 97 extends over pulley 101, out the other aperture 98 and over the other pulley 104. Each engine throttle control cable is adapted to operate the throttle of a different one of engines 24 and 25. As shown in FIGURE 16 and also in FIGURE 5, engine throttle control cable 97 is connected to a link 105 which is connected through another link 106 to an arm 107 secured to a throttle rod 108. It should be noted that while links 105 and 106 are rigidly connected together, as is link 106 and arm 107, nevertheless the angular relationship between these links and arm 107 can be adjusted to alter the effective length of the engine throttle control cable, and hence to alter the effect that the engine throttle control cable has on throttling its engine. I should be noted that pulleys 104 are located on the pivot axis 33a of control rod 103. The reason for this will become more apparent hereinafter.

While I have described the connection between engine throttle control cable 97 and the throttle of engine 24 controlled thereby, it will be appreciated that a similar connection is made to permit engine throttle cable 96 to operate the throttle of engine 25.

In order to increase the speed of both engines 24 and 25 simultaneously and to the same extent, the operator rotates handgrip control rod 64 in one direction, which has the effect of shortening the effective length of engine throttle control cables 96 and 97 and causing rotation of throttle rods 108, the effective length of engine throttle control cables 96 and 97 being the length of the cables from pulleys 101 and 102 to links 105. After rotation of handgrip control rod 64 to an increased speed position, the engine speed of both engines can be reduced the same amount by rotating handgrip control rod 64 in the opposite direction, the return springs (not shown) in the engine throttles serving to take up the slack of the engine throttle control cables 96 and 97.

When it is desired to execute a turn, head 62 is rotated in one direction or othe other. If head 62 is rotated in a counter-clockwise direction from the position shown in FIGURE 14, it will be seen that the effective length of engine throttle control cable 96 will be increased, while the effective length of engine throttle control cable 97 will be decreased, this being the result of having pulleys 101 and 102 laterally offset with respect to the longitudinal axis of handgrip control rod 64. Consequently engine 24 will be accelerated and engine 25 will be decelerated as a result of counter-clockwise rotation of head 62. Accordingly, wheels 11 driven by engine 24 will be driven faster than wheels 11 driven by engine 25, and the vehicle will turn to the right. If head 62 is rotated sufficiently far in a counter-clockwise direction, the braking action on engine 25 as hereinbefore discussed will take place automatically, thereby increasing the sharpness of the turn. Clockwise rotation of head 62 will accelerate engine 25 and decelerate engine 24, and continued clockwise rotation of head 62 will result in braking of engine 24 for a sharp left turn.

It is important to note that forward or backward movement of control rod 33 does not alter the effective length of engine throttle control cables 96 and 97, and hence does not change the speed of engines 24 and 25, because pulleys 104 are mounted on the pivot axis 33a of control rod 33.

As noted hreinbefore, in the event that finger 95 should assume either dotted position shown in FIGURE 15, further rotation of handgrip control rod 64 in the same direction as that which caused finger 95 to assume its position will result in slippage of spring 94 on handgrip control rod 64 and will prevent breakage of engine throttle control cables 96 and 97. It will be appreciated that the full range of engine throttle speeds is achieved between the dotted positions of finger 95 in FIGURE 15, and that unless finger 95 is in one of the dotted positions, spring 94 grips handgrip control rod 64 sufficiently tightly that it is carried thereby.

*General operation*

In the operation of a vehicle embodying my invention, engines 24 and 25 are started and control rod 33 is placed in the perpendicular position shown in FIGURE 7. The adjustment of centrifugal clutches 29 is such that the clutches remain disengaged when engines 24 and 25 are idling. In order to start the vehicle moving, handgrip control rod 64 is rotated in the direction of increasing throttle speed which results in joint acceleration of both engines 24 and 25 causing engagement of clutches 29 and the transmission of power to wheels 11. At appropriate intervals control rod 33 is moved forward to alter the transmission ratio and to enable the vehicle to pick up speed. The operations of braking and steering have been discussed hereinbefore and need not be repeated.

Those skilled in the art will appreciate that while I have disclosed preferred embodiments of my invention numerous changes and alterations may be made therein without departing from the spirit and scope of my invention.

What I claim as my invention is:

1. In combination with a vehicle of the type having a body and wheels rotatably associated therewith on both sides thereof and supporting said body, driving means for driving said vehicle and control means for controlling said driving means, said driving means comprising two independently operable internal combustion engines, two independently operable centrifugal clutches, one of said clutches being driven by one of said engines, the other of said clutches being driven by the other of said engines, two braking means, one of said braking means being adapted to brake said one engine, the other of said braking means being adapted to brake said other engine, two independent variable speed pulleys each being of a type having two discs biased towards each other and movable relative to each other in a direction parallel to the axis of rotation of said variable speed pulley to vary the spacing between said discs and thereby to alter the position of a belt seated between said discs relative to the axis of rotation of said variable pulley, second and third pulley means, first and second belt means, said first belt means driving one of said variable speed pulleys from said second pulley means, said second belt means driving said second pulley means from the output side of said one clutch, third and fourth belt means, said third belt means driving the other of said variable speed pulleys from said third pulley means, said fourth belt means driving said third pulley means from the output side of said other clutch, first driven means driven by said one variable speed pulley and connected to rotate at least one of said wheels on one side of said vehicle independently of said wheels on the other side of said vehicle, and second driven means driven by said other variable speed pulley and connected to rotate at least one of said wheels on said other side of said vehicle independently of said wheels on said one side of said vehicle, said control means comprising a rod pivotably mounted at a pivot axis adjacent one end of said rod and between said engines for forward and backward movement, a head mounted on said rod remote from said pivot axis and rotatable about the longitudinal axis of said rod, a handgrip control rod extending on either side of said head and rotatably mounted therein, a first engine throttle control cable operatively connected between said handgrip control rod and the throttle of said one engine, a second engine throttle control cable operatively connected between said handgrip control rod and the throttle of said other engine, first brake control rod means connected to operate said one braking means, second brake control rod means connected to operate said other braking means, and brake lever means mounted on said rod and engageable with said first and second brake control rod means for operating said first and second brake control rod means, said second and third pulley means being rotatably mounted on said rod with the axes of rotation of said second and third pulley means spaced from said pivot axis of said rod, whereby said second and third pulley means move with said rod during forward and backward movement thereof.

2. The invention according to claim 1 including first and second propelling means for propelling said vehicle through water, one of said propelling means acting on one side of the longitudinal axis of said vehicle and the other of said propelling means acting on the other side of said longitudinal axis of said vehicle, said one propelling means being driven by said one engine, said other propelling means being driven by said other engine.

3. The invention according to claim 2 wherein said first and second propelling means each comprises a water pump, one of said pumps having a water inlet on one side of said vehicle in fluid flow relationship with said water and a water outlet on said one side of said longitudinal axis of said vehicle, the other of said pumps having a water inlet on the other side of said vehicle in fluid flow relationship with said water and a water outlet on said other side of said longitudinal axis of said vehicle, said water pumps each being adapted to impel water sternwardly through said outlets.

4. The invention according to claim 1 wherein said one braking means comprises a curved brake band, a surface of said one clutch forming a cylindrical brake drum for said brake band, and wherein said other braking means comprises a curved brake band, a surface of said other clutch forming a cylindrical brake drum for said last mentioned brake band.

5. The invention according to claim 4 wherein each of said brake bands extends at least part way around different ones of said brake drums, each of said brake bands is secured to said rod on an opposite side thereof, at a point spaced from said pivot axis, said brake control rod means being connected to draw said brake bands into contact with said brake drums, the rotational axes of said brake drums being coincident with said pivot axis, whereby the same relative spacing beween said brake bands and said brake drums is maintained during forward and backward movement of said rod.

6. The invention according to claim 1 including link means coupling said first and second brake control rod means, said first and second brake control rod means being independently slidably mounted in said link means, and stop means carried by said first and second brake control rod means and engageable with said link means to limit sliding movement of said first and second brake control rod means in said link means, said brake lever means being adapted to co-operate with said link means to operate said first and second brake control rod means and said one and other braking means jointly.

7. The invention according to claim 6 including first and second cam slots disposed on opposite sides of said head, first and second pins riding in said first and second cam slots respectively, first connecting means connecting said first pin and said first brake control rod means, second connecting means connecting said second pin and said second brake control rod means, said first cam slot being adapted to raise said first pin and said first brake control rod means upon rotation of said head in one direction, said second cam slot being adapted to raise said second pin and said second brake control rod means upon rotation of said head in the opposite direction.

8. The invention according to claim 6 including first and second cam slots disposed on opposite sides of said head, first and second pins riding in said first and second cam slots respectively, first connecting means connecting said first pin and said first brake control rod means, second connecting means connecting said second pin and said second brake control rod means, said first cam slot being adapted to raise said first pin and said first brake control rod means upon rotation of said head in one direction, said second cam slot being adapted to raise said second pin and said second brake control rod means upon rotation of said head in the opposite direction, and including first fixed guide means for said first engine throttle control cable and second fixed guide means for said second engine throttle control cable, said first and second guide means being positioned adjacent each other and laterally offset from said hand grip control rod, guide means mounted on said pivot axis of said first-mentioned rod, said first engine throttle control cable extending over said first and said last-mentioned guide means, said second engine throttle control cable extending over said second and said last-mentioned guide means, whereby upon forward and backward movement of said single rod about said pivot axis the effective length of said engine throttle control cables remains constant, and whereby upon rotation of said head in one direction the effective length of one of said engine throttle control cables increases while the effective length of the other of said engine throttle control cables decreases, and upon rotation of said head in the opposite direction the effective length of said one engine throttle control cable decreases while the effective length of said other engine control cable increases, and further including spring means resiliently gripping said hand grip control rod and having a projecting finger adapted to engage the inner side walls of said head upon a predetermined amount of rotation of said hand grip control rod, said first and second engine throttle control cables being connected to said spring means, said spring means being adapted to slip on said hand grip control rod upon engagement of said finger with said head and to rotate with said hand grip control rod when said finger is disengaged from said head.

9. The invention according to claim 1 including first fixed guide means for said first engine throttle control cable and second fixed guide means for said second engine throttle control cable, said first and second guide means being positioned adjacent each other and laterally offset from said handgrip control rod, said first engine throttle control cable extending over said first guide means, said second engine throttle control cable extending over said second guide means, whereby upon rotation of said head in one direction the effective length of one of said engine throttle control cables increases while the effective length of the other of said engine throttle control cables decreases, and upon rotation of said head in the opposite direction the effective length of said one engine throttle control cable decreases while the effective length of said other engine throttle control cable increases.

10. The invention according to claim 9 including guide means mounted on said pivot axis, said engine throttle control cables passing over said last-mentioned guide means, whereby upon forward and backward movement of said first-mentioned rod about said pivot axis the effective length of said engine throttle control cables remains constant.

11. The invention according to claim 1 including link means coupling said first and second brake control rod means, said first and second brake control rod means being independently slidabley mounted in said link means, stop means carried by said first and second brake control rod means and engageable with said link means to limit sliding movement of said first and second brake control rod means in said link means, said brake lever means being adapted to co-operate with said link means to operate said first and second brake control rod means and said one and other braking means jointly, and including first and second guide means for said first engine throttle control cable and third and fourth guide means for said second engine throttle control cable, said first and third guide means being fixed in position, positioned adjacent each other and laterally offset from said hand grip control rod, said second and fourth guide means being mounted on opposite sides of said single rod and on said pivot axis of said single rod, said first engine throttle control cable extending over said first and second guide means, said second engine throttle control cable extending over said third and fourth guide means, whereby upon forward and backward movement of said single rod about said pivot axis the effective length of said engine throttle control cables remains constant, and whereby upon rotation of said head in one direction the effective length of one of said engine throttle control cables increases while the effective length of the other of said engine throttle control cables decreases, and upon rotation of said head in the opposite direction the effective length of said one engine throttle control cable decreases while the effective length of said other engine throttle control cable increases.

12. The invention according to claim 11 wherein said one braking means comprises a curved brake band, a surface of said one clutch forming a cylindrical brake drum for said brake band, wherein said other braking means comprises a curved brake band, a surface of said other clutch forming a cylindrical brake drum for said last mentioned brake band, wherein each of said brake bands extends at least part way around different ones of said brake drums, and wherein each of said brake bands is secured to said rod on an opposite side thereof at a point spaced from said pivot axis, said brake control rod means being connected to draw said brake bands into contact with said brake drums, the rotational axes of said brake drums being coincident with said pivot axis, whereby the same relative spacing between said brake bands and said brake drums is maintained during forward and backward movement of said rod.

13. The invention according to claim 1 including spring means resiliently gripping said hand grip control rod and having a projecting finger adapted to engage the inner side walls of said head upon a predetermined amount of rotation of said hand grip control rod, said first and second engine throttle control cables being connected to said spring means, said spring means being adapted to slip on said hand grip control rod upon engagement of said finger with said head and to rotate with said hand grip control rod when said finger is disengaged from said head.

14. A control system especially suited for independently and jointly controlling two internal combustion engines, said system comprising a single rod pivotably mounted at a pivot axis adjacent one end for forward and backward movement, a head mounted on said rod remote from said pivot axis and rotatable about the longitudinal axis of said rod, a hand grip control rod extending on either side of said head and rotatably mounted therein, first and second throttle control cables connected to said hand grip control rod and each adapted for connection to the throttle of an engine, first fixed guide means for said first engine throttle control cable, second fixed guide means for said second engine throttle control cable, said first and second guide means being positioned adjacent each other and laterally offset from said hand grip control rod, said first engine throttle control cable extending over said first guide means, said second engine throttle control cable extending over said second guide means, whereby upon rotation of said head in one direction the effective length of one of said engine throttle control cables increases while the effective length of the other of said engine throttle control cables decreases, and upon rotation of said head in the opposite direction the effective length of said one engine throttle control cable decreases while the effective length of said other engine throttle control cable increases, said system further including a brake lever mounted on said rod, first brake control rod means adapted for operative connection to one braking means, second brake control rod means adapted for operative connection to another braking means, link means coupling said first and second brake control rod means, said first and second brake control rod means being independently slidably mounted in said link means, and stop means carried by said first and second brake control rod means and engageable with said link means to limit sliding movement of said first and second brake control rod means in said link means, said brake lever being adapted to co-operate with said link means to operate said first and second brake control rod means jointly.

15. The invention according to claim 14 including first and second cam slots disposed on opposite sides of said head, first and second pins riding in said first and second cam slots respectively, first connecting means connecting said first pin and said first brake control rod means, second connecting means connecting said second pin and said second brake control rod means, said first cam slot being adapted to raise said first pin and said first brake control rod means upon rotation of said head in one direction, said second cam slot being adapted to raise said second pin and said second brake control rod means upon rotation of said head in the opposite direction.

16. A control system especially suited for independently and jointly controlling two internal combustion engines, said system comprising a rod pivotably mounted at a pivot axis adjacent one end for forward and backward movement, a head mounted on said rod remote from said pivot axis and rotatable about the longitudinal axis of said rod, a hand grip control rod extending on either side of said head and rotatably mounted therein, first and second throttle control cables connected to said hand grip control rod and each adapted for connection to the throttle of an engine, first fixed guide means for said first engine throttle control cable, second fixed guide means for said second engine throttle control cable, said first and second guide means being positioned adjacent each other and laterally offset from said hand grip control rod, said first engine throttle control cable extending over said first guide means, said second engine throttle control cable extending over said second guide means, whereby upon rotation of said head in one direction the effective length of one of said engine throttle control cables increases while the effective length of the other of said engine throttle control cables decreases, and upon rotation of said head in the opposite direction the effective length of said one engine throttle control cable decreases while the effective length of said other engine throttle control cable increases, and guide means mounted on said pivot axis of said rod, said engine throttle control cables passing over said last-mentioned guide means, whereby upon forward and backward movement of said rod about said pivot axis the effective length of said engine throttle control cables remains constant.

17. A control system especially suited for independently and jointly controlling two internal combustion engines, said system comprising a rod pivotably mounted at a pivot axis adjacent one end for forward and backward movement, a head mounted on said rod remote from said pivot axis and rotatable about the longitudinal axis of said rod, a hand grip control rod extending on either side of said head and rotatably mounted therein, first and second throttle control cables connected to said hand grip control rod and each adapted for connection to the throttle of an engine, first fixed guide means for said first engine throttle control cable, second fixed guide means for said second engine throttle control cable, said first and second guide means being positioned adjacent each other and laterally offset from said hand grip control rod, said first engine throttle control cable extending over said first guide means, said second engine throttle control cable extending over said second guide means, whereby upon rotation of said head in one direction the effective length of one of said engine throttle control cables increases while the effective length of the other of said engine throttle control cables decreases, and upon rotation of said head in the opposite direction the effective length of said one engine throttle control cable decreases while the effective length of said other engine throttle control cable increases, and third and fourth guide means mounted on opposite sides of said rod and on said pivot axis, said first engine throttle control cable extending over said third guide means, said second engine throttle control cable extending over said fourth guide means, whereby upon forward and backward movement of said rod about said pivot axis the effective length of said engine throttle control cables remains constant.

18. A control system especially suited for independently and jointly controlling two internal combustion engines, said system comprising a rod pivotably mounted at a pivot axis adjacent one end for forward and backward movement, a head mounted on said rod remote from said pivot axis and rotatable about the longitudinal axis of said rod, a hand grip control rod extending on either side of said head and rotatably mounted therein, first and second throttle control cables connected to said hand grip control rod and each adapted for connection to the throttle of an engine, first fixed guide means for said first engine throttle control cable, second fixed guide means for said second engine throttle control cable, said first and second guide means being positioned adjacent each other and laterally offset from said hand grip control rod, said first engine throttle control cable extending over said first guide means, said second engine throttle control cable extending over said second guide means, whereby upon rotation of said head in one direction the effective length of one of said engine throttle control cables increases while the effective length of the other of said engine throttle control cables decreases, and upon rotation of said head in the opposite direction the effective length of said one engine throttle control cable decreases while the effective length of said other engine throttle control cable increases, and spring means resiliently gripping said hand grip control rod and having a projecting finger adapted to engage the inner side walls of said head upon a predetermined degree of rotation of said hand grip control rod, said first and second engine throttle control cables being connected to said spring means, said spring means being adapted to slip on said hand grip control rod upon engagement of said finger with said head and to rotate with said hand grip control rod when said finger is disengaged from said head.

19. A brake control system for independently and jointly controlling two braking means, said system comprising first and second brake control rods positioned side by side and each connected to operate a different braking means, link means coupling said first and second brake control rods, said first and second brake control rods being independently slidably mounted in said link means, stop means carried by said first and second brake control rods and engageable with said link means to limit sliding movement of said first and second brake control rods in said link means, a housing, said brake control rods and link means being positioned in said housing, a head mounted on said housing and rotatable about the longitudinal axis of said housing, first and second cam slots disposed on opposite sides of said head, first and second pins riding in said first and second cam slots respectively, first connecting means connecting said first pin and said first brake control rod, second connecting means connecting said second pin and said second brake control rod, said first cam slot being adapted to raise said first pin and said first brake control rod upon rotation of said head in one direction, said second cam slot being adapted to raise said second pin and said second brake control rod upon rotation of said head in the opposite direction.

20. The invention according to claim 19 including brake lever means movably mounted on said housing and adapted to engage said link means to raise and lower said brake control rods jointly.

21. In a control system especially suited for controlling two braking means, the combination comprising two cylindrical brake drums, a rod pivotably mounted at a pivot axis adjacent one end and between said brake drums for forward and backward movement, two curved brake bands, each of said brake bands being secured to said rod on an opposite side thereof at a point spaced from said pivot axis, one of said brake bands co-operating with one of said brake drums and extending at least part way around said one brake drum, the other of said brake bands co-operating with the other of said brake drums and extending at least part way around said other brake drum, and means for drawing said brake bands into contact with said brake drums, the rotational axes of said brake drums being coincident with said pivot axis, whereby the same relative spacing between said brake bands and said brake drums is maintained during forward and backward movement of said rod.

22. The invention according to claim 21 wherein said means for drawing said brake bands into contact with said brake drums comprises first and second brake control rods positioned side by side and extending along said pivotably mounted rod, means connecting said brake control rods each to a different one of said brake bands, link means coupling said first and second brake control rods, said first and second brake control rods being independently slidably mounted in said link means, stop means carried by said first and second brake control rods and engageable with said link means to limit sliding movement of said first and second brake control rods in said link means.

23. The invention according to claim 21 wherein each of said brake bands has two ends, one end of each of said brake bands being secured to said rod on an opposite side thereof and on the same side of said pivot axis and at said point, the other end of each of said brake bands being positioned adjacent said one end of said rod on the other side of said pivot axis and spaced from said pivot axis.

24. The invention according to claim 23 wherein said means for drawing said brake bands into contact with said brake drums comprises first and second brake control rods extending along said pivotably mounted rod, means for raising and lowering said brake control rods, and means connecting said brake control rods each to a different one of said other ends of said brake bands, whereby upon raising and lowering of said brake control rods said brake bands engage with and disengage from said brake drums.

25. In combination with a braking system comprising two cylindrical brake drums and two curved brake bands each co-operating with a different one of said brake drums and extending at least part way around a different one of said brake drums, a rod pivotably mounted at a pivot axis adjacent one end and between said brake drums for forward and backward movement, each of said brake bands being secured to said rod on an opposite side thereof at a point spaced from said pivot axis, first and second brake control rods positioned side by side in said pivotably mounted rod and each connected to operate a different one of said brake bands, link means coupling said brake control rods, said first and second brake control rods being independently slidably mounted in said link means, stop means carried by said first and second brake control rods and engageable with said link means to limit sliding movement of said first and second brake control rods in said link means, a head mounted on said pivotably mounted rod remote from said pivot axis and rotatable about the longitudinal axis of said pivotably mounted rod, first and second cam slots disposed on opposite sides of said head, first and second pins riding in said first and second cam slots respectively, first connecting means connecting said first pin and said first brake control rod, second connecting means connecting said second pin and said second brake control rod, said first cam slot being adapted to raise said first pin and said first brake control rod upon rotation of said head in one direction, said second cam slot being adapted to raise said second pin and said second brake control rod upon rotation of said head in the opposite direction, the rotational axes of said brake drums being coincident with said pivot axis, whereby the same relative spacing between said brake bands and said brake drums is maintained during forward and backward movement of said pivotably mounted rod.

References Cited by the Examiner

UNITED STATES PATENTS

| 1,067,783 | 7/13 | Gaines | 188—77 |
| 1,254,057 | 1/18 | Moore. | |
| 1,825,577 | 9/31 | Carr | 180—6 |
| 1,915,772 | 6/33 | Ziegler. | |
| 2,406,290 | 8/46 | Hait | 115—1 |

FOREIGN PATENTS 850,111   9/52   Germany.

OTHER REFERENCES

Gaedt, German application G 17,157, printed July 5, 1956 (Kl. 63c).

A. HARRY LEVY, *Primary Examiner.*

PHILIP ARNOLD, *Examiner.*